United States Patent Office 3,377,040
Patented Apr. 9, 1968

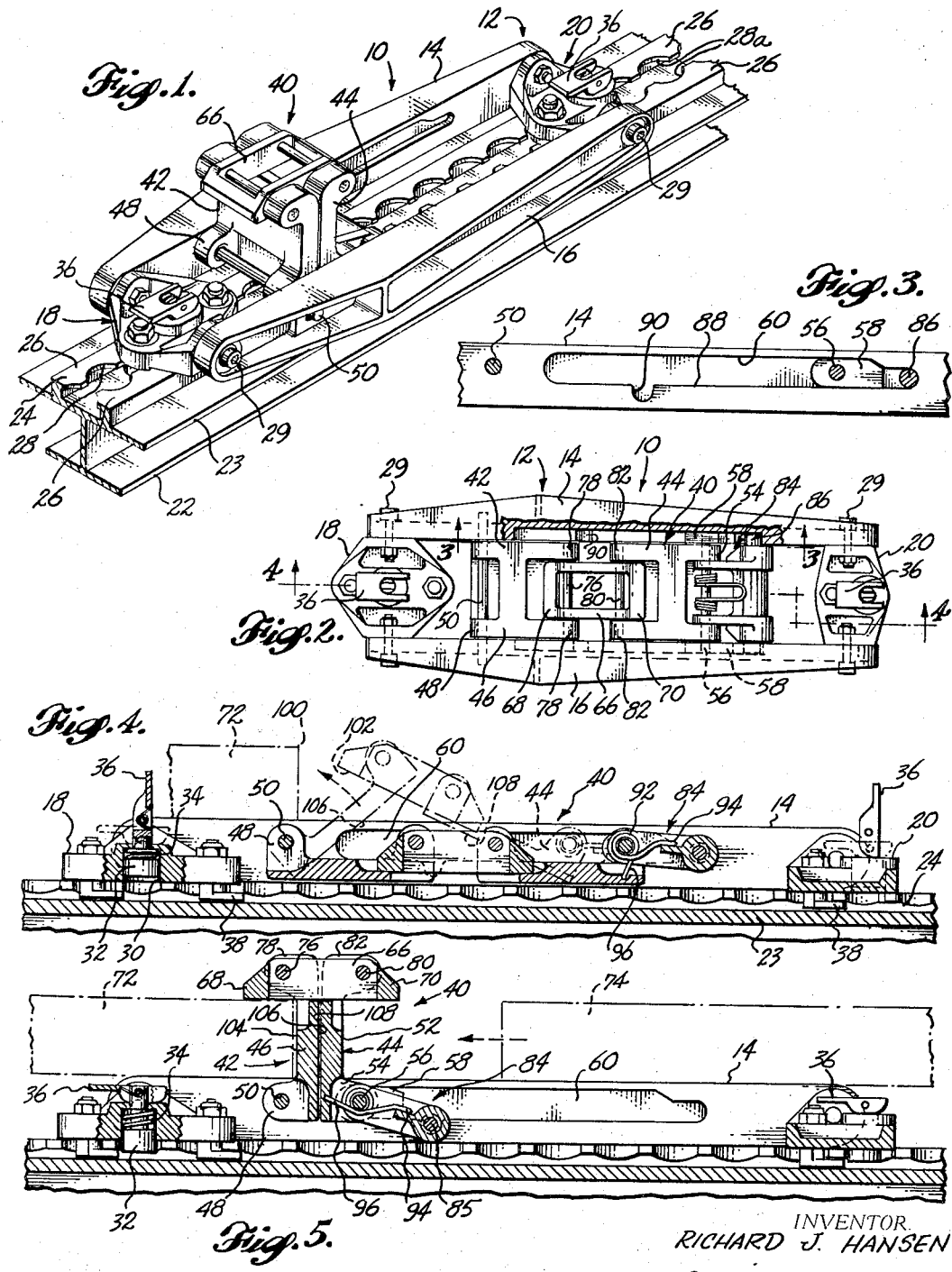

3,377,040
RETRACTABLE CARGO SECURING DEVICE
Richard J. Hansen, Seattle, Wash., assignor to The Boeing Company, Seattle, Wash., a corporation of Delaware
Filed Dec. 5, 1966, Ser. No. 599,312
6 Claims. (Cl. 248—119)

ABSTRACT OF THE DISCLOSURE

This invention relates to a cargo securing device and more particularly to a cargo securing device which can be positioned in a retracted position and then raised to a cargo engaging position. There is a base frame having a cargo securing assembly comprising a lug member pivotally secured to two other members which are, in turn, swing mounted to the base frame.

---

The preferred embodiment of the present invention comprises a base frame adapted to be selectively mounted at various floor locations to a floor member of an aircraft. Mounted to this frame is a retractable cargo securing assembly comprising a first and second member, each of which has a root end by which it is secured to the base frame, and a swing end which can be raised to an upright cargo engaging position, the root end of the first member being pivotally secured to the base frame at a fixed location and the root end of the second member being pivotally secured to the base frame in a manner that it can slide longitudinally thereof. The swing end of each of the first and second members is pivotally secured to a related end of a lug or cargo engaging member, which in the retracted position lies horizontally within the base frame, and in its cargo engaging position is wholly above the base frame to grip the edge of an adjacent cargo pallet. Further, there is a locking member pivotally mounted to the root end of the second member and arranged to lock the first and second members in their upright cargo engaging position, this locking member being spring loaded to insure proper locking thereof and to insure proper action of the securing assembly.

The present invention was specifically designed for aircraft use as part of a system called a "quick-change" system by which an airplane can very quickly (e.g., in a matter of 15 minutes or possibly less) be converted from a passenger carrying aircraft to a cargo carrying aircraft, and vice versa. In this "quick-change" system, when the airplane is to be used as a passenger carrying aircraft, the various cargo securing devices which are placed at various floor locations are retracted into the floor, and seat pallets are brought into the airplane and secured to the floor. When the airplane is to be converted back to a cargo carrier, the seat pallets are removed and the airplane is ready to receive cargo pallets therein. Cargo pallets of predetermined dimensions are moved into the airplane, and cargo securing devices are raised to their cargo engaging positions, which devices operate so that cargo securing lugs move up to engage the pallets to hold the same securely in position on the floor of the aircraft. Obviously, to be suitable for aircraft use, such securing devices must be highly reliable, able to withstand high loads (such as those which may be experienced in an emergency landing condition of the aircraft), and lightweight and compact in construction. Further, for design considerations, it is essential that the overall height dimension of the securing device in its retracted position be kept within a reasonable minimum so that when seat pallets are placed in the airplane, the overall thickness of the floor structure of the aircraft is kept to a minimum dimension.

Thus, it is an object of the present invention to provide an improved retractable cargo securing device of the type described above, which has especially desirable characteristics for use in an aircraft, and particularly in an aircraft which serves both cargo and passenger carrying functions.

Thus, it is an object to provide such a cargo securing device which is reliable, sufficiently strong, relatively simple, compact, easy to operate and maintain, and has a relatively small thickness (i.e., height dimension).

It is a further particular object to provide such a device which in its cargo engaging position can reach over a cargo pallet an adequate distance to properly grip the cargo pallet, and yet in its retracted position has a relatively small height dimension.

These and other objects and features of the invention will be more readily understood and appreciated from the following detailed description of the preferred embodiment thereof selected for purposes of illustration and shown in the accompanying drawings, in which:

FIGURE 1 is a perspective view of a cargo securing device made according to the present invention;

FIGURE 2 is a top plan view thereof, drawn to a reduced scale;

FIGURE 3 is a fragmentary, transverse sectional view taken on line 3—3 of FIGURE 2;

FIGURE 4 is a transverse sectional view taken along line 4—4 of FIGURE 2, showing in full lines the device in its retracted position, and showing in broken lines the device being moved to its upstanding cargo engaging position; and FIGURE 5 is a view taken along the same line as FIGURE 4, showing the device in its cargo engaging position, and further showing in broken lines a forward cargo pallet being properly held by the device and a second cargo pallet being moved into an engaging position with respect to the device.

With reference to the accompanying drawings, the cargo securing device of the present invention is generally designated 10, and comprises a base frame 12 made up of right and left sections 14 and 16, respectively. At the forward and rear ends, respectively, of the base frame 12 are a forward and rear foot member 18 and 20, respectively, by which the base frame 12 can be fastened to a structural floor member of the aircraft, which as shown herein is an I-beam 22 with an expanded upper flange 23 to which is secured a slotted member 24. This slotted member 24 comprises two opposed inwardly extending horizontal lip members 26 which collectively define a channel. The two lips 26 have matching, longitudinally spaced, arcuate cutouts 28, with each matching pair of cutouts defining a circular recess 28a.

Each of the foot members 18 and 20 is pivotally mounted about a transverse horizontal axis (as at 29) to the frame 12, and is formed with a vertical, downwardly open recess 30 to accommodate a related cylindrical plug 32 adapted to fit into any selected one of the circular recesses 28a. Each plug 32 is urged by a compression spring 34 in the recess 30 downwardly to its engaged position, and is also provided with a cam-like lifting lever 36 by which it can conveniently be retracted into its recess 30 (this being illustrated in FIGURE 4).

The rear foot member 20 has fixedly secured thereto a single toe member 38 having a circular configuration matching that of each of the circular cutouts 28a, this toe member 38 being spaced from its plug member 32 a distance moderately less than the spacing of the cutouts 28. The front foot 18 is similarly provided with two such toe members 38. To secure the two foot members 18 and 20 to the slotted member 24 of the I-beam 22, the two feet 18 and 20 are placed onto the slotted member 24 so that each of the toe members 38 drops down into a related recess 28a. Then the entire device is shifted a short distance longitudinally so that the toe members 38 each slip under an adjacent lip portion 26 that is located between the cutouts 28. This brings each of the plugs 32 into registration with a related recess 28a, and the lever arms 36 of the plugs 32 are then dropped down to permit the plugs 32 to drop into their related recesses 28a and thus secure the device to the floor beam 22.

Located between the right and left sections 14 and 16 of the base frame 12 and between the front and rear foot members 18 and 20 is a cargo securing assembly 40, which as indicated previously is believed to be especially significant in the present invention. This assembly comprises a first and second lug carrying member designated 42 and 44, respectively. The member 42 comprises a generally flat body portion 46 having a root end and a swing end. At the root end of the member 42 there are a pair of ears 48 by which the member 42 is swing mounted about a transversely extending pin 50 connected between the frame sections 14 and 16 at a fixed location thereat.

The second lug carrying member 44 is constructed similarly to the other member 42, and thus comprises a flat body portion 52 having a root end and a swing end, and being provided with a pair of ears 54 at its root end. A pin 56 extends through these ears 54, and each end of this pin 56 is pivotally mounted to a respective one of two shoes 58, each of which is slide mounted in a respective longitudinal slot 60 formed in the inside surface of its related frame section 14 or 16. Thus, the second lug carrying member 44 is both pivotally mounted to the frame 12 and mounted also for slide motion along the longitudinal axis thereof.

Interconnecting the two members 42 and 44 is a lug member 66. This lug member 66 has a generally flat configuration and has front and rear nose portions 68 and 70, respectively, the front nose portion 68 being arranged to grip a rear upper surface portion of a cargo pallet (shown in broken lines at 72), and the rear nose 70 being similarly arranged to grip a second pallet 74 located rearwardly thereof. The lug member 66 has a front transverse pin 76 by which it is pivotally connected to a pair of ears 78 fixedly connected to the swing end of the first lug carrying member 42, and there is a similar transverse pin 80 at the rear end of the lug member 66 by which the member 66 is pivotally connected to ears 82 at the swing end of the second lug carrying member 44.

Pivotally connected to the pin 56 and extending rearwardly therefrom is a locking member 84. This locking member 84 has at its rear end a pin 85 which provides a pair of laterally extending fingers 86, each of which fits into a related one of the aforementioned slots 60 of the frame sections 14 and 16. Each of these slots 60 has at the forward portion of its lower edge 88 a detent 90 to receive a respective one of the fingers 86. To urge the fingers 86 into locking engagement with the detents 90, there is provided a spring member 92 which is coiled around the pin 56, with the two arm portions 94 and 96 engaging, respectively, the locking member 84 and the second lug carrying member 44 in a manner that the locking fingers 86 are urged downwardly.

In the following description of the operation of this device, let it first be assumed that the securing device 10 has been secured to the floor beam 22 at a predetermined location, this being accomplished in the aforedescribed manner by securing the forward and rear foot members 18 and 20 of the device in the slotted member 24 of the beam 22. Normally, the cargo securing assembly 40 will be in a retracted position (as shown in FIGURE 2 and as shown in full line in FIGURE 4). That is to say, the second lug securing member 44 has been slid to its furthest rearward position, so that the two lug carrying members 42 and 44 and the lug member 66 all are horizontally disposed in substantially the same plane between the two frame sections 14 and 16, with no part of the cargo securing assembly 40 extending above these frame sections 14 and 16. With the securing assembly 40 in this retracted position, this assembly 40 offers no interference to seat pallets or cargo pallets being moved over the floor in which the device 10 is recessibly mounted.

To describe the cargo securing function of this device 10, reference is now made to FIGURES 4 and 5 wherein is shown a first cargo pallet 72 which has been moved to its proper position. The lug member 66 is then pulled upwardly, this lifting action causing the forward lug carrying member 42 to swing upwardly and forwardly, and the rear lug carrying member 44 to slide forwardly and also swing upwardly. During this lifting action the spring 92 presses downwardly on the rear lug securing member 44 so that the front nose portion 68 of the lug member 66 points moderately upwardly (as illustrated in FIGURE 4) and thus slips over upper rear edge portion 100 of the pallet 72, so that the lower surface 102 of the front nose portion 68 engages the upper rear surface portion of the pallet 72. When the member 42 reaches its fully upright position, the upper surface 104 of the member 42 has also moved to an upright position where it engages the side edge of the pallet 72, while the lower surface 106 of the member 42 also has moved to an upright position where it butts against the corresponding lower surface 108 of the second member 44. This engaging relationship of the two surfaces 106 and 108 prevents the two members 42 and 44 from slanting to any significant degree from an upright position.

When the two members 42 and 44 have been swung to their fully upright position (as shown in FIGURES 1 and 5), the two fingers 86 of the locking member 84 have come into registration with the aforementioned detents 90. The action of the spring 92 presses the fingers 86 into locking engagement with the detents 90, thus securing the assembly 40 to its upright cargo engaging position. Then the second cargo pallet 74 can be slid forwardly so that the rear nose portion 70 reaches over the front edge portion of the pallet 74. When it is desired to unload the cargo from the airplane, the pallet 74 is slid rearwardly, the rear end of the locking member 84 is lifted so that the fingers 86 are moved upwardly and out of locking engagement with the detents 90, so that the securing assembly 40 falls into its retracted position between the frame sections 14 and 16. It is to be noted that since in the retracted position of the assembly 40 the cargo securing lug member 66 is horizontally disposed, the two nose portions 68 and 70 of the lug member 66 can be made to extend outwardly to a degree sufficient to properly perform their cargo pallet engaging functions, without causing any increase in the thickness dimension of the assembly 40 in its retracted position.

Therefore, I claim:

1. A securing device, comprising:
   (a) a base member adapted to be mounted in a recess in a floor,
   (b) a first member having a root end by which said first member is pivotally secured to said base member, and having a swing end which can be swung upwardly from a first retracted position to a second upstanding cargo engaging position,
   (c) a second member having a root end which is both pivotally and slidably secured to said base member so as to be movable longitudinally along said base member, and having a swing end which can be swung upwardly from a first retracted position to a second upstanding cargo engaging position,
   (d) a cargo securing lug member which is pivotally secured by one end to the swing end of said first member, and by the other end to the swing end of said second member so as to be carried by said first and second member, whereby with said first and second members in their upstanding cargo engaging position, said lug member is horizontally disposed and raised above said base member in a cargo engaging location, and with said first and second members in their retracted position, said lug member is still horizontally disposed and is in a retracted position in said base member, and (e) a locking member connected to the root end of said second member and having locking means thereon to engage said base member so as to prevent slide motion of said second member and thus hold said first and second members in their second cargo engaging positions.

2. The securing device as recited in claim 1, wherein said locking member has a first and second end, said first end being pivotally connected to the root end of said second member, and said second end being slide mounted in said base member, said base member having detent means to engage the second end of said locking member in locking engagement when said first and second members are in their second cargo engaging positions, and wherein there is spring means operatively connected between said second member and said locking member to urge said second member and said locking member to be swung downwardly with respect to one another.

3. The securing device as recited in claim 2, wherein there is a transverse pin member by which said locking member is connected to said second member, and said spring means is mounted to said pin, said spring means having two arms, one of which engages said second member and the other of which engages said locking member.

4. The securing device as recited in claim 3, wherein said base member is formed with a pair of longitudinal slots, and the second end of said locking member has a pair of laterally extending fingers, each of which is slide mounted in a respective one of said slots, said detent means comprising two detents, one in each slot to receive a respective one of said fingers.

5. The apparatus as recited in claim 2, wherein said first and second members are so arranged with respect to one another that with said first and second members in their second upstanding position, said first and second members present opposed engaging surfaces which coact to prevent said first and second members from slanting from their upstanding position.

6. The apparatus as recited in claim 5, wherein said lug member has a generally flat configuration and has front and rear pallet engaging nose portions, which nose portions extend horizontally beyond the locations where said lug member is connected to said first and second members.

References Cited

UNITED STATES PATENTS

| | | | |
|---|---|---|---|
| 3,204,581 | 9/1965 | Davidson | 248—361 |
| 3,210,038 | 10/1965 | Bader et al. | 248—361 |
| 3,282,229 | 11/1966 | Elsner | 105—369 |
| 3,282,550 | 11/1966 | Warren | 248—361 |

JOHN PETO, *Primary Examiner.*